(12) United States Patent
Barrus et al.

(10) Patent No.: US 9,715,521 B2
(45) Date of Patent: Jul. 25, 2017

(54) DATA SCRUBBING IN CLUSTER-BASED STORAGE SYSTEMS

(71) Applicant: Exablox Corporation, Sunnyvale, CA (US)

(72) Inventors: Frank E. Barrus, New Ipswich, NH (US); Tad Hunt, Sunnyvale, CA (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 250 days.

(21) Appl. No.: 14/309,796

(22) Filed: Jun. 19, 2014

(65) Prior Publication Data

US 2014/0379671 A1 Dec. 25, 2014

Related U.S. Application Data (60) Provisional application No. 61/837,078, filed on Jun. 19, 2013.

(51) Int. Cl.
| | | |
|---|---|---|
| G06F 17/30 | (2006.01) | |
| G06F 11/10 | (2006.01) | |
| G06F 11/20 | (2006.01) | |

(52) U.S. Cl.
CPC .... G06F 17/30371 (2013.01); G06F 11/1076 (2013.01); G06F 11/2094 (2013.01); G06F 2211/1088 (2013.01)

(58) Field of Classification Search
None
See application file for complete search history.

(56) References Cited

U.S. PATENT DOCUMENTS

| | | | |
|---|---|---|---|
| 4,656,604 | A | 4/1987 | van Loon |
| 4,660,130 | A | 4/1987 | Bartley et al. |
| 5,420,999 | A | 5/1995 | Mundy |
| 5,561,778 | A | 10/1996 | Fecteau et al. |
| 6,098,079 | A | 8/2000 | Howard |
| 6,154,747 | A | 11/2000 | Hunt |
| 6,167,437 | A | 12/2000 | Stevens et al. |
| 6,314,435 | B1 | 11/2001 | Wollrath et al. |
| 6,356,916 | B1 | 3/2002 | Yamatari et al. |

(Continued)

FOREIGN PATENT DOCUMENTS

| | | |
|---|---|---|
| EP | 1285354 | 2/2003 |
| EP | 2575379 | 4/2013 |

(Continued)

OTHER PUBLICATIONS

International Search Report dated Aug. 6, 2013 Application No. PCT/US2013/035675.

(Continued)

*Primary Examiner* — Richard Bowen
(74) *Attorney, Agent, or Firm* — Maschoff Brennan (57) ABSTRACT

Disclosed is the technology for data scrubbing in a cluster-based storage system. This technology allows protecting data against failures of storage devices by periodically reading data object replicas and data object hashes stored in a plurality of storage devices and rewriting those data object replicas that have errors. The present disclosure addresses aspects of writing data object replicas and hashes, checking validity of data object replicas, and performing data scrubbing based upon results of the checking.

21 Claims, 7 Drawing Sheets

(56) References Cited

U.S. PATENT DOCUMENTS

| | | |
|---|---|---|
| 6,480,950 B1 | 11/2002 | Lyubashevskiy et al. |
| 6,772,162 B2 | 8/2004 | Waldo et al. |
| 7,043,494 B1 | 5/2006 | Joshi et al. |
| 7,177,980 B2 | 2/2007 | Milillo et al. |
| 7,197,622 B2 | 3/2007 | Torkelsson et al. |
| 7,266,555 B1 | 9/2007 | Coates et al. |
| 7,293,140 B2 | 11/2007 | Kano |
| 7,392,421 B1 | 6/2008 | Bloomstein et al. |
| 7,403,961 B1 | 7/2008 | Deepak et al. |
| 7,454,592 B1 | 11/2008 | Shah et al. |
| 7,509,360 B2 | 3/2009 | Wollrath et al. |
| 7,539,836 B1 | 5/2009 | Klinkner |
| 7,685,109 B1 | 3/2010 | Ransil et al. |
| 7,725,437 B2 | 5/2010 | Kirshenbaum et al. |
| 7,827,218 B1 | 11/2010 | Mittal |
| 7,990,979 B2 | 8/2011 | Lu et al. |
| 8,019,882 B2 | 9/2011 | Rao et al. |
| 8,099,605 B1 | 1/2012 | Billsrom et al. |
| 8,132,168 B2 | 3/2012 | Wires et al. |
| 8,239,584 B1 | 8/2012 | Rabe et al. |
| 8,364,887 B2 | 1/2013 | Wong et al. |
| 8,407,438 B1 | 3/2013 | Ranade |
| 8,447,733 B2 | 5/2013 | Sudhakar |
| 8,572,290 B1 | 10/2013 | Mukhopadhyay et al. |
| 8,868,926 B2 | 10/2014 | Hunt et al. |
| 9,009,202 B2 | 4/2015 | Patterson |
| 9,043,567 B1 | 5/2015 | Modukuri et al. |
| 2002/0069340 A1 | 6/2002 | Tindal et al. |
| 2002/0087590 A1 | 7/2002 | Bacon et al. |
| 2003/0028514 A1 | 2/2003 | Lord et al. |
| 2003/0028585 A1 | 2/2003 | Yeager et al. |
| 2003/0056139 A1 | 3/2003 | Murray et al. |
| 2003/0072259 A1 | 4/2003 | Mor |
| 2003/0101173 A1 | 5/2003 | Lanzatella et al. |
| 2003/0115408 A1 | 6/2003 | Milillo et al. |
| 2004/0093361 A1 | 5/2004 | Therrien et al. |
| 2004/0158588 A1 | 8/2004 | Pruet |
| 2004/0167898 A1 | 8/2004 | Margolus et al. |
| 2005/0071335 A1 | 3/2005 | Kadatch |
| 2005/0080928 A1 | 4/2005 | Beverly et al. |
| 2005/0081041 A1 | 4/2005 | Hwang |
| 2005/0160170 A1 | 7/2005 | Schreter |
| 2005/0256972 A1 | 11/2005 | Cochran et al. |
| 2006/0039371 A1 | 2/2006 | Castro et al. |
| 2006/0083247 A1 | 4/2006 | Mehta |
| 2006/0156396 A1 | 7/2006 | Hochfield et al. |
| 2006/0271540 A1 | 11/2006 | Williams |
| 2007/0005746 A1 | 1/2007 | Roe et al. |
| 2007/0130232 A1 | 6/2007 | Therrien et al. |
| 2007/0203960 A1 | 8/2007 | Guo |
| 2007/0230368 A1 | 10/2007 | Shi et al. |
| 2007/0233828 A1 | 10/2007 | Gilbert |
| 2007/0271303 A1 | 11/2007 | Menendez et al. |
| 2007/0276838 A1 | 11/2007 | Abushanab et al. |
| 2007/0276843 A1 | 11/2007 | Lillibridge et al. |
| 2008/0005624 A1 | 1/2008 | Kakivaya et al. |
| 2008/0016507 A1 | 1/2008 | Thomas et al. |
| 2008/0126434 A1 | 5/2008 | Uysal et al. |
| 2008/0133893 A1 | 6/2008 | Glew |
| 2008/0147872 A1 | 6/2008 | Regnier |
| 2008/0170550 A1 | 7/2008 | Liu et al. |
| 2008/0183973 A1 | 7/2008 | Aguilera et al. |
| 2008/0243879 A1* | 10/2008 | Gokhale ............. G06F 11/1453 |
| 2008/0243938 A1 | 10/2008 | Kottomtharayil et al. |
| 2008/0244199 A1 | 10/2008 | Nakamura et al. |
| 2008/0292281 A1 | 11/2008 | Pecqueur et al. |
| 2009/0049240 A1 | 2/2009 | Oe et al. |
| 2009/0100212 A1 | 4/2009 | Boyd et al. |
| 2009/0172139 A1 | 7/2009 | Wong et al. |
| 2009/0198927 A1 | 8/2009 | Bondurant et al. |
| 2009/0199041 A1 | 8/2009 | Fukui et al. |
| 2009/0307292 A1 | 12/2009 | Li et al. |
| 2009/0327312 A1 | 12/2009 | Kakivaya et al. |
| 2010/0023941 A1 | 1/2010 | Iwamatsu et al. |
| 2010/0031000 A1 | 2/2010 | Flynn et al. |
| 2010/0036862 A1 | 2/2010 | Das et al. |
| 2010/0114336 A1 | 5/2010 | Konieczny et al. |
| 2010/0114905 A1 | 5/2010 | Slavik et al. |
| 2010/0122330 A1 | 5/2010 | McMillan et al. |
| 2010/0161817 A1 | 6/2010 | Xiao et al. |
| 2010/0172180 A1 | 7/2010 | Paley et al. |
| 2010/0191783 A1 | 7/2010 | Mason et al. |
| 2010/0217953 A1 | 8/2010 | Beaman et al. |
| 2010/0228798 A1 | 9/2010 | Kodama et al. |
| 2010/0262797 A1 | 10/2010 | Rosikiewicz et al. |
| 2010/0318645 A1 | 12/2010 | Hoole et al. |
| 2010/0332456 A1 | 12/2010 | Prahlad et al. |
| 2011/0026439 A1 | 2/2011 | Rollins |
| 2011/0029711 A1 | 2/2011 | Dhuse et al. |
| 2011/0034176 A1 | 2/2011 | Lord et al. |
| 2011/0060918 A1 | 3/2011 | Troncoso Pastoriza et al. |
| 2011/0106795 A1 | 5/2011 | Maim |
| 2011/0138123 A1 | 6/2011 | Gurajada et al. |
| 2011/0213754 A1 | 9/2011 | Bindal et al. |
| 2011/0231374 A1 | 9/2011 | Jain et al. |
| 2011/0231524 A1 | 9/2011 | Lin et al. |
| 2011/0264712 A1 | 10/2011 | Ylonen |
| 2011/0264989 A1 | 10/2011 | Resch et al. |
| 2011/0271007 A1 | 11/2011 | Wang et al. |
| 2012/0011337 A1* | 1/2012 | Aizman ............. G06F 11/1076 711/162 |
| 2012/0030260 A1 | 2/2012 | Lu et al. |
| 2012/0030408 A1 | 2/2012 | Flynn et al. |
| 2012/0047181 A1 | 2/2012 | Baudel |
| 2012/0060072 A1 | 3/2012 | Simitci et al. |
| 2012/0078915 A1 | 3/2012 | Darcy |
| 2012/0096217 A1 | 4/2012 | Son et al. |
| 2012/0147937 A1 | 6/2012 | Goss et al. |
| 2012/0173790 A1 | 7/2012 | Hetzler et al. |
| 2012/0179808 A1 | 7/2012 | Bergkvist et al. |
| 2012/0179820 A1 | 7/2012 | Ringdahl et al. |
| 2012/0185555 A1 | 7/2012 | Regni et al. |
| 2012/0210095 A1 | 8/2012 | Nellans et al. |
| 2012/0233251 A1 | 9/2012 | Holt et al. |
| 2012/0278511 A1 | 11/2012 | Alatorre et al. |
| 2012/0290535 A1 | 11/2012 | Patel et al. |
| 2012/0290629 A1 | 11/2012 | Beaverson et al. |
| 2012/0310892 A1 | 12/2012 | Dam et al. |
| 2012/0323850 A1 | 12/2012 | Hildebrand et al. |
| 2012/0331528 A1 | 12/2012 | Fu et al. |
| 2013/0013571 A1 | 1/2013 | Sorenson, III et al. |
| 2013/0041931 A1 | 2/2013 | Brand |
| 2013/0054924 A1 | 2/2013 | Dudgeon et al. |
| 2013/0067270 A1* | 3/2013 | Lee ..................... G06F 11/1004 714/6.1 |
| 2013/0073821 A1 | 3/2013 | Flynn et al. |
| 2013/0086004 A1 | 4/2013 | Chao et al. |
| 2013/0091180 A1 | 4/2013 | Vicat-Blanc-Primet et al. |
| 2013/0162160 A1 | 6/2013 | Ganton et al. |
| 2013/0166818 A1 | 6/2013 | Sela |
| 2013/0185508 A1 | 7/2013 | Talagala et al. |
| 2013/0232313 A1 | 9/2013 | Patel et al. |
| 2013/0235192 A1 | 9/2013 | Quinn et al. |
| 2013/0246589 A1 | 9/2013 | Klemba et al. |
| 2013/0262638 A1 | 10/2013 | Kumarasamy et al. |
| 2013/0263151 A1 | 10/2013 | Li et al. |
| 2013/0268644 A1 | 10/2013 | Hardin et al. |
| 2013/0268770 A1 | 10/2013 | Hunt et al. |
| 2013/0282798 A1 | 10/2013 | McCarthy et al. |
| 2013/0288668 A1 | 10/2013 | Pragada et al. |
| 2013/0311574 A1 | 11/2013 | Lal |
| 2013/0346591 A1 | 12/2013 | Carroll et al. |
| 2013/0346839 A1 | 12/2013 | Dinha |
| 2014/0006580 A1 | 1/2014 | Raghu |
| 2014/0007178 A1 | 1/2014 | Gillum et al. |
| 2014/0059405 A1 | 2/2014 | Syu et al. |
| 2014/0143206 A1* | 5/2014 | Pittelko ............... G06F 11/1448 707/634 |
| 2014/0181575 A1* | 6/2014 | Kalach ................ G06F 11/1415 714/6.11 |
| 2014/0297604 A1 | 10/2014 | Brand |
| 2014/0317065 A1 | 10/2014 | Barrus |
| 2014/0335480 A1 | 11/2014 | Asenjo et al. |
| 2014/0351419 A1 | 11/2014 | Hunt et al. |

(56) References Cited

U.S. PATENT DOCUMENTS

| | | |
|---|---|---|
| 2014/0372490 A1 | 12/2014 | Barrus et al. |
| 2015/0012763 A1 | 1/2015 | Cohen et al. |
| 2015/0019491 A1 | 1/2015 | Hunt et al. |
| 2015/0066524 A1 | 3/2015 | Fairbrothers et al. |
| 2015/0081964 A1 | 3/2015 | Kihara et al. |
| 2015/0106335 A1 | 4/2015 | Hunt et al. |
| 2015/0106579 A1 | 4/2015 | Barrus |
| 2015/0172114 A1 | 6/2015 | Tarlano et al. |
| 2015/0220578 A1 | 8/2015 | Hunt et al. |
| 2015/0222616 A1 | 8/2015 | Tarlano et al. |

FOREIGN PATENT DOCUMENTS

| | | |
|---|---|---|
| EP | 2834749 | 2/2015 |
| EP | 2834943 | 2/2015 |
| EP | 2989549 A1 | 3/2016 |
| EP | 3000205 A1 | 3/2016 |
| EP | 3000289 A2 | 3/2016 |
| EP | 3008647 A1 | 4/2016 |
| EP | 3011428 A1 | 4/2016 |
| EP | 3019960 | 5/2016 |
| EP | 3020259 | 5/2016 |
| JP | 2004252663 A | 9/2004 |
| JP | 2008533570 A | 8/2008 |
| JP | 2010146067 A | 7/2010 |
| JP | 2011095976 A | 5/2011 |
| JP | 2012048424 A | 3/2012 |
| WO | WO2013152357 | 10/2013 |
| WO | WO2013152358 | 10/2013 |
| WO | WO2014176264 | 10/2014 |
| WO | WO2014190093 | 11/2014 |
| WO | WO2014201270 | 12/2014 |
| WO | WO2014205286 | 12/2014 |
| WO | WO2015006371 | 1/2015 |
| WO | WO2015054664 A1 | 4/2015 |
| WO | WO2015057576 A1 | 4/2015 |
| WO | WO2015088761 A1 | 6/2015 |
| WO | WO2015116863 A1 | 8/2015 |
| WO | WO2015120071 A2 | 8/2015 |

OTHER PUBLICATIONS

Huck et al. Architectural Support for Translation Table Management in Large Address Space Machines. ISCA '93 Proceedings of the 20th Annual International Symposium on Computer Architecture, vol. 21, No. 2. May 1993. pp. 39-50.
International Search Report dated Aug. 2, 2013 Application No. PCT/US2013/035673.
International Search Report dated Sep. 10, 2014 Application No. PCT/US2014/035008.
Askitis, Nikolas et al., "HAT-trie: A Cache-conscious Trie-based Data Structure for Strings".
International Search Report dated Sep. 24, 2014 Application No. PCT/US2014/039036.
International Search Report dated Oct. 22, 2014 Application No. PCT/US2014/043283.
International Search Report dated Nov. 7, 2014 Application No. PCT/US2014/042155.
International Search Report dated Jan. 1, 2015 Application No. PCT/US2014/060176.
International Search Report dated Feb. 24, 2015 Application No. PCT/US2014/060280.
International Search Report dated Mar. 4, 2015 Application No. PCT/US2014/067110.
International Search Report dated Apr. 2, 2015 Application No. PCT/US2014/045822.
International Sesarch Report dated May 14, 2015 Application No. PCT/US2015/013611.
International Sesarch Report dated May 15, 2015 Application No. PCT/US2015/014492.
Invitation pursuant to Rule 63(1) dated May 19, 2015 Application No. 13772293.0.
Extended European Search Report dated Aug. 4, 2015 Application No. 13771965.4.
Dabek et al. "Wide-area cooperative storage with CFS", Proceedings of the ACM Symposium on Operating Systems Principles, Oct. 1, 2001. pp. 202-215.
Stoica et al. "Chord: A Scalable Peer-to-peer Lookup Service for Internet Applications", Computer Communication Review, ACM, New York, NY, US, vol. 31, No. 4, Oct. 1, 2001. pp. 149-160.
Non-Final Office Action, Jun. 24, 2015, U.S. Appl. No. 13/441,592, filed Apr. 6, 2012.
Non-Final Office Action, Jun. 29, 2015, U.S. Appl. No. 14/055,662, filed Oct. 16, 2013.
Non-Final Office Action, Aug. 11, 2015, U.S. Appl. No. 14/171,651, filed Feb. 3, 2014.
Final Office Action, Nov. 27, 2015, U.S. Appl. No. 13/441,592, filed Apr. 6, 2012.
Advisory Action, Feb. 19, 2016, U.S. Appl. No. 13/441,592, filed Apr. 6, 2012.
Final Office Action, Nov. 27, 2015, U.S. Appl. No. 14/171,651, filed Feb. 3, 2014.
Final Office Action, Nov. 20, 2015, U.S. Appl. No. 14/055,662, filed Oct. 16, 2013.
Advisory Action, Jan. 29, 2016, U.S. Appl. No. 14/055,662, filed Oct. 16, 2013.
Office Action, Dec. 10, 2015, U.S. Appl. No. 13/939,106, filed Jul. 10, 2013.
Non-Final Office Action, Jan. 11, 2016, U.S. Appl. No. 14/284,351, filed May 21, 2014.
Advisory Action, Jan. 12, 2016, U.S. Appl. No. 14/171,651, filed Feb. 3, 2014.
Office Action, Mar. 15, 2016, U.S. Appl. No. 14/171,651, filed Feb. 3, 2014.
Office Action, Apr. 5, 2016, U.S. Appl. No. 14/257,905, filed Apr. 21, 2014.
Office Action, Apr. 21, 2016, U.S. Appl. No. 14/105,099, filed Dec. 12, 2013.
Extended European Search Report dated Aug. 20, 2015 Application No. 13772293.0.
Office Action dated Mar. 15, 2016 in Japanese Patent Application No. 2015-504769 filed Apr. 8, 2013.
Joao, Jose et al., "Flexible Reference-Counting-Based Hardware Acceleration for Garbage Collection," Jun. 2009, ISCA '09: Proceedings of the 36th annual internaltional symposium on Computer Architecture, pp. 418-428.
Office Action dated Mar. 29, 2016 in Japanese Patent Application No. 2015-504768 filed Apr. 8, 2013, pp. 1-16.
Notice of Allowance dated Jul. 26, 2016 for Japanese Patent Application No. 2015-504768 filed Apr. 8, 2013, pp. 1-4.

\* cited by examiner

DATA SCRUBBING IN CLUSTER-BASED STORAGE SYSTEMS

CROSS-REFERENCE TO RELATED APPLICATIONS

The present application claims benefit of U.S. provisional application No. 61/837,078, filed on Jun. 19, 2013. The disclosure of the aforementioned application is incorporated herein by reference for all purposes.

TECHNICAL FIELD

This disclosure relates generally to data processing, and more specifically, to data scrubbing in cluster-based storage systems.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A typical computer storage system includes one or more memory devices that are configured to store digital data associated with software, digital documents, and other resources. For example, a memory device may include a mechanical hard disk drive (HHD), solid-state drive (SSD), such as NAND (Negated AND or NOT AND) flash, random access memory (RAM), read only memory (ROM), or other types of devices. Each type of memory device may be suitable for a particular purpose, performance range, and operational environment.

In general, memory devices are subject to failure, and thus data stored on various memory devices (magnetically, optically, electronically, and so on) may experience various decays. For example, data stored magnetically (e.g., on HDD) may be lost due to magnetic fields decay. Furthermore, data stored by altering material structure (e.g., SSD) may be lost due to further change in its structure. Both HDDs and SSDs may be prone to physical damage, complete and partial failures to some sections. Other issues, such as firmware and software bugs may also cause various issues to data stored on memory devices.

One common solution to alleviate these issues is to duplicate data across redundant disk drives. One such redundant drive approach is facilitated by the Redundant Array of Independent Disks (RAID). Multiple physical disks comprise an array where parity data is added to the original data before storing the data across the array. The parity is calculated such that the failure of one or more disks will not result in the loss of the original data. The original data can be reconstructed from a functioning disk if one or more disks fail. The RAID may use, for example, three or more disks to protect data from failures of any of the disks.

Because the RAID involves replicating data at the storage level, it may propagate errors across multiple copies if the copied data already had errors when copied. Other shortcomings of traditional RAID solution may be associated with editing data in-place, which may cause creating additional errors in the data objects being edited or creating errors in nearby data objects. For example, writing to a SSD device may affect structure of nearby material leading to errors in other data sectors.

Accordingly, there is a need to develop a storage technique that minimizes adverse effects of storage device failures, provides improved efficiency, and enhances protection against data loss.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an aspect of the present disclosure, a method is provided for data scrubbing in a cluster-based storage system. The method may include maintaining the cluster-based storage system including a plurality of storage devices, which are configured to maintain a plurality of data objects and related information as described herein. Further, the method may include storing a plurality of replicas associated with a data object in a predefined number of the storage devices, for example, one replica per storage device. The method may also include storing a plurality of hash values associated with each replica in the plurality of storage devices, for example, one hash value per storage device.

In certain embodiments, the hash values may be computed over an object data using a hash function which may guarantee that different object values are statistically likely to result in different hashes. For example, a cryptographic hash function SHA1 can be used. SHA1 generates a hash value with $2^{160}$ different possible values, thereby making it statistically unlikely that two or more data objects with different content will result in the same hash values.

In certain embodiments, the hash value of each data object may be calculated before the data object is delivered to the cluster to ensure that hash value is calculated before any corruptions within the cluster. In general, the closer the hash value is computed to the origin of the data object, the more types of failures can be remedied. In yet other embodiments, a hash value for each data object can be calculated and then delivered along with its corresponding data object to the cluster-based storage system. Using this approach, it may be ensured that the data object does not get corrupted while in transit from a client to the cluster-based storage system.

Furthermore, the method for data scrubbing may also include loading a first hash value of a plurality of hash values from one of the storage devices. The method may further include loading a replica of the data object corresponding to the first hash value. The method may also include calculating a second hash value with respect to the first data object. The method may also include comparing the first hash value and the second hash value to identify a corruption of either the data object or the first hash value. Based on the comparison (e.g., if the first hash value differs from the second hash value), the method may proceed to restoring, by the one or more processors, the data object, based at least in part on one replica of the plurality of replicas.

In certain embodiments, the cluster-based storage system may include a plurality of storage devices for storing data objects. Furthermore, each storage device may be divided into multiple index sections and data sections, wherein an index section may store hash values and sizes of corresponding data objects stored in the data sections. In certain embodiments, the method for data scrubbing may commence with generating a hash value of a data object, writing one or more data object replicas and the hash value to one or more storage devices, storing the one or more data objects in data sections and the corresponding hash values in index sections.

It should be understood that generating the hash value and writing the one or more data objects is not strictly necessary to accomplish the goals of the claimed invention. Thus, the hash value may have already been generated and data object written.

In certain embodiments, the hash values may include digital signatures of the data objects. Examples of signature algorithms resulting in digital signatures include SHA-1, SHA-3, TIGER, and so forth. In certain embodiments, the method may include periodic scanning of the storage devices. During the scanning, the previously mentioned steps for loading the hash value and corresponding data object are performed for each replica stored in all storage devices. Accordingly, each data object replica may be assessed on its validity by comparing the loaded hash value and recomputed hash value. If there is no difference between the two, the corresponding data object is considered valid. Otherwise, if the first hash value differs from the second hash value, the data object is replaced with an already verified replica. In this regard, it is important that each data object replica is already verified.

In certain embodiments, when it is verified that no data object replicas of a certain data object are free from corruption, the method may proceed to attempt a computational recovery process.

In particular, according to a first computational recovery process, single bit errors in hash values, which include "strong" digital signatures generated by methods mentioned above, may be detected, and corrected without prior knowledge of whether there are also errors in a corresponding data object. To this end, the method may first compute a hash value of the data object, and then adjust the hash value by performing flipping (inversing) of bits of the hash value one at a time, comparing the adjusted hash value to the computed hash value. This process may be repeated until there is a match or every single bit flip has been tried. If a match is found, the corruption has been detected, and a new hash value can be written to a corresponding storage device.

Alternatively, if no match is found, according to a second computational recovery process, the hash value retrieved from the storage device can be considered to be correct, and the algorithm can proceed to attempt to recover from a single bit error in the data object. To this end, the method may adjust the data object by performing flipping (inversing) bits of the stored data object value one at a time, computing a hash value of the adjusted data object by comparing the adjusted hash value to the stored hash value. This process may be repeated until there is a match or every single bit flip has been tried. If a match is found, the corruption has been detected and the new data object can be written back to a storage device.

In certain embodiments, if both of the above first and second computational recovery processes fail to find a match, it may mean that more than one bit in the hash value or data object may need to be flipped to identify the error, following the same scheme as above. Thus, in certain embodiments, the above described computational recovery processes may be repeated, but more than one bit may be flipped at a time.

In certain embodiments, this algorithm can be run in parallel. In other words, there may be multiple parallel running computational recovery processes, each flipping a specific number of bits in hash values and data objects.

In various embodiments, the scanning of the storage devices may be performed regularly, however the frequency of scanning may be based upon one or more predetermined rules or criteria. In example embodiments, the frequency of scanning may depend on an age of storage device, time of use, storage device health reports, operational state (e.g., idle state), and so forth. In various embodiments, the scanning of the storage devices may be opportunistic, that is performed during unrelated read operations. In other words, the scanning process may take advantage of read operations initiated by unrelated accesses, such as retrieving an object at the request of an end user.

In further example embodiments of the present disclosure, there is provided a file system configured to implement the method steps described herein. In yet other example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or,"

such that "A or B" includes "A but not B," "B but not A," and "A and B," unless otherwise indicated.

Techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a server, desktop computer, tablet computer, laptop computer), game console, handheld gaming device, cellular phone, smart phone, smart television system, and so forth.

The technology described herein relates to data scrubbing in cluster-based storage systems. This technology allows protecting data against failures of storage devices by periodical reading data object replicas stored in a plurality of storage devices and rewriting data object replicas that have been damaged. The present disclosure addresses aspects of writing data object replicas, checking validity of data object replicas, and performing data scrubbing based upon the results of the checking.

Figure 1:
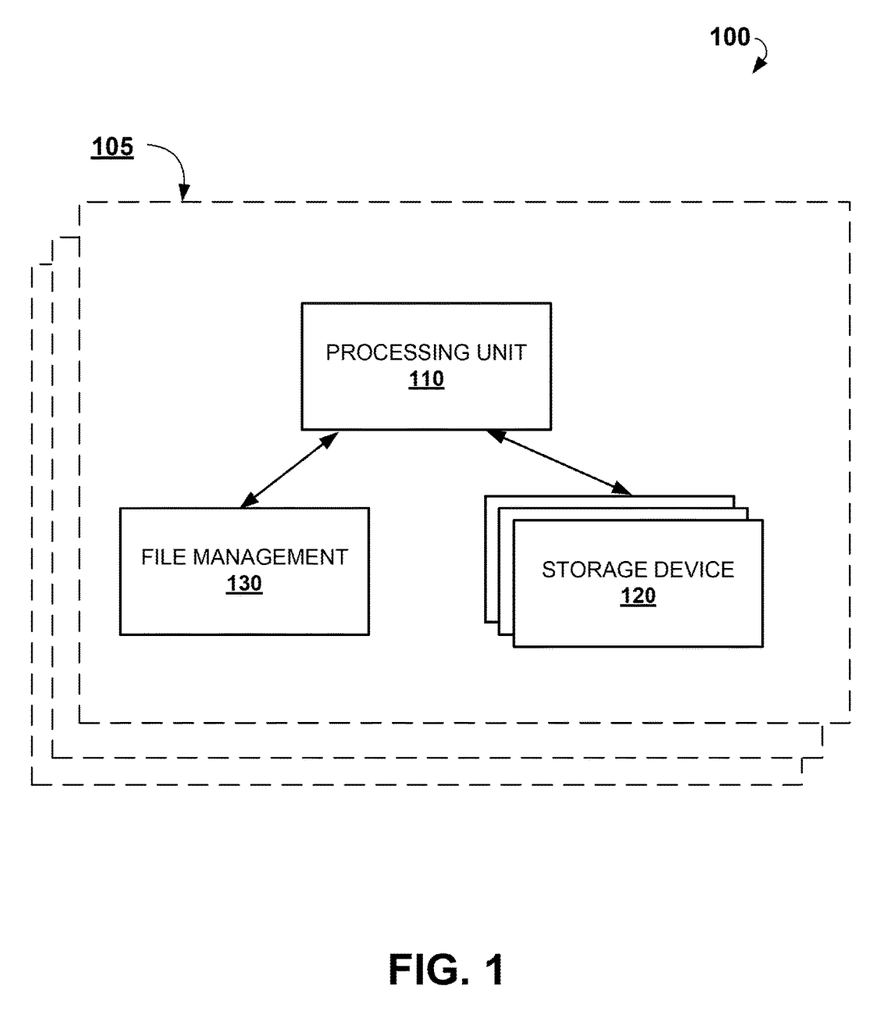
FIG. 1 shows a high level block diagram of an example system architecture suitable for implementing the embodiments disclosed herein.

FIG. 1 shows a high level block diagram of example system architecture 100 suitable for implementing the embodiments disclosed herein. The system architecture 100 may include a distributed storage network (DSN) consisting of one or more storage nodes 105. Each of the nodes 105 may communicate with other nodes 105 via a network, which makes the architecture 100 a cluster-based storage system.

As shown in the figure, each of the storage nodes 105 includes a processing unit 110 such as a processor, controller, microprocessor, microcontroller, logic, central processing unit (CPU), or any other similar computing device. In certain embodiments, the processing unit 110 may reside in a user device or in network environment (e.g., in a server). Each of the storage nodes 105 also includes a plurality of storage devices 120 configured to store data objects and related information such as hash values and digital signatures. Each of the storage nodes 105 may also include a file management unit 130. The file management unit 130 may be configured to manage transfers and storage of data objects in the plurality of storage devices 120. In yet other examples, however, there may be just one file management unit 130 for the entire system 100.

Figure 2:
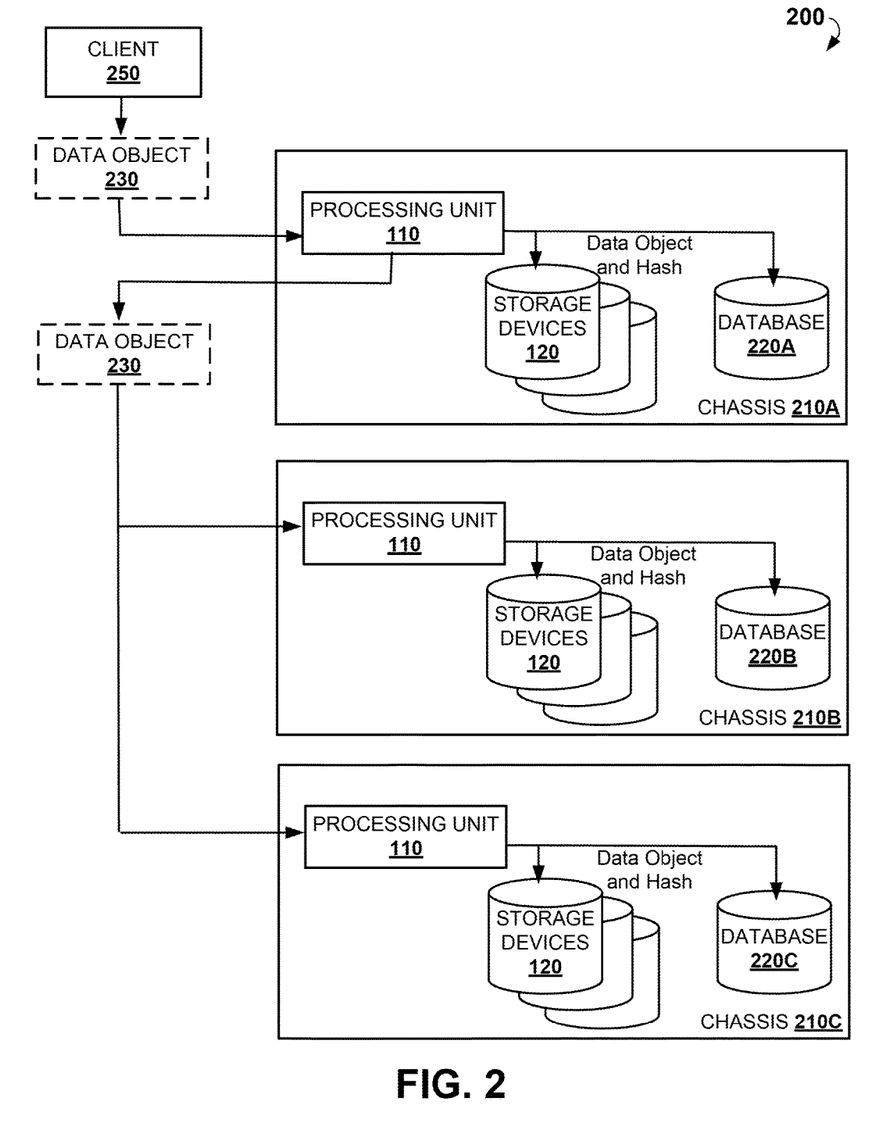
FIG. 2 shows a high level block diagram of example system architecture illustrating writing process of a data object.

FIG. 2 shows a high level block diagram of example system architecture 200 illustrating writing process of a data object 230 from client 250 according to an example embodiment. As shown in the figure, there are shown several chassis 210A-C. Each of the chassis A-C, for example, may include several storage devices 120 for storing data objects. The storage devices 120 may be selected from a wide range of computer memories such as a mechanical hard disk drive (HHD), solid-state drive (SSD), NAND flash, RAM, ROM, or other types of storage devices. The chassis 210A-C may also include a database 220A-C for storing hash values, addresses of data objects, digital signatures, and so forth.

According to various embodiments of the present disclosure, a certain number of data object 230 replicas may be generated and stored on multiple chassis 210A-C, one data object 230 per chassis. Each chassis the data object 230 is replicated to is responsible for storing on an internal storage device 120 the data object 230 and the data object hash. If there are not enough chassis to achieve the desired replication factor, a chassis may store additional replicas on other internal storage devices 120. For example, the processing unit 110 may generate three replicas of this data object 230, and send one replica to each chassis 210B-C, and store one replica on an internal storage device 120. Upon receiving the data object on chassis 210B-C, each chassis will store one replica on an internal storage device 120. The processing unit 110, in certain embodiments, may also be a part of the chassis 210A-C.

The present technology ensures that data objects 230 are never overwritten. Thus, new versions of the data objects 230 may be written to previously unused disk space, and locations of old versions may not be added to the unused space until after the new version has been committed. Traditional storage systems, in contrast, may edit data in-place, thereby overwriting stored data.

Figure 3:
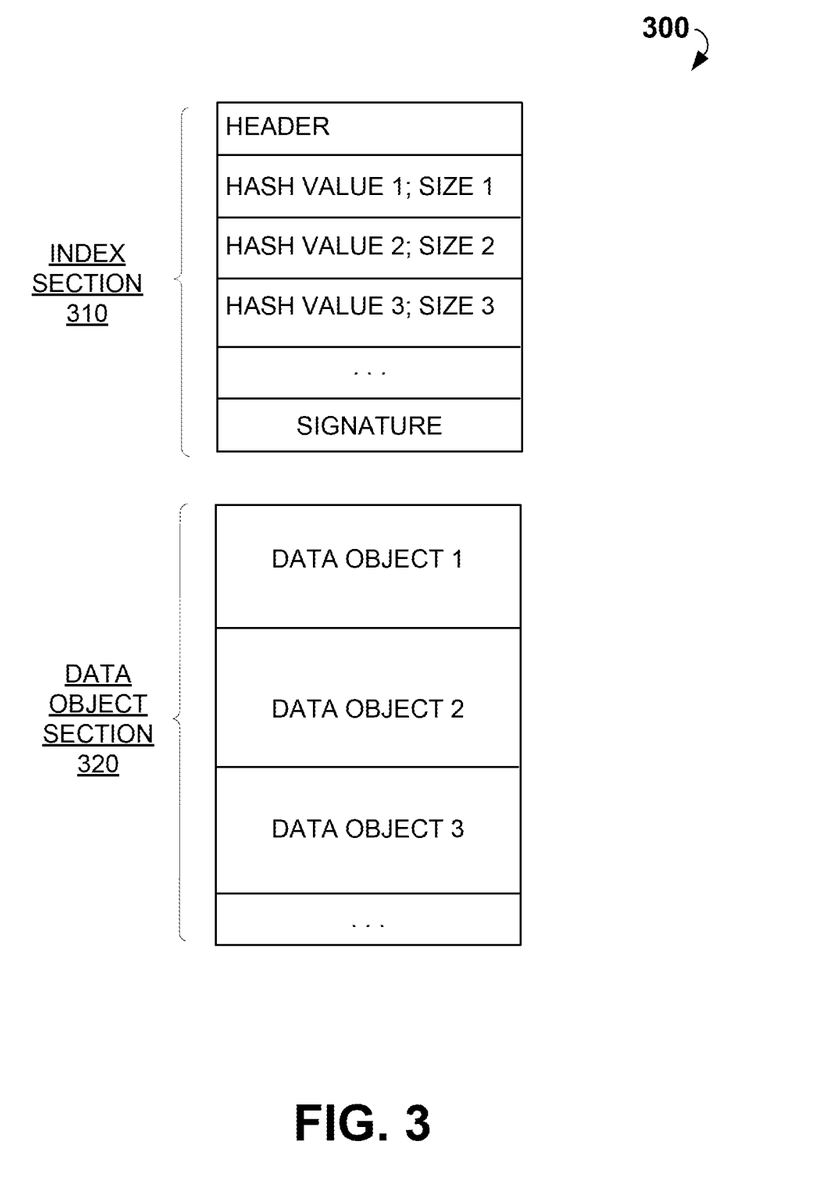
FIG. 3 shows a high level diagram of storage device(s).

FIG. 3 shows a high level diagram of the data structures stored on the storage devices 120 according to an example embodiment. In particular, there is shown an example structure 300 employed by the storage devices 120, which may include an index section 310 and a data object section 320. The data object section 320 may store various data objects such as files, file parts, information items, software codes, or any other digital information. The index section 310 may include a header, hash values, sizes associated with each data object stored in the data object section 320, and a digital signature. The hash values may be calculated utilizing any suitable hash algorithm resistant to collisions, for example, a Secure Hash Algorithm (SHA). In certain embodiments, the index section 310 may also include a digital signature, which may be associated with the index section 310. In certain embodiments, the digital signature may include a hash value, such as a SHA value, computed over the contents of the entire index section 310. It should be also clear that although only three data objects and three hash values are shown, the number of such data objects and hash values may vary.

Figure 4:
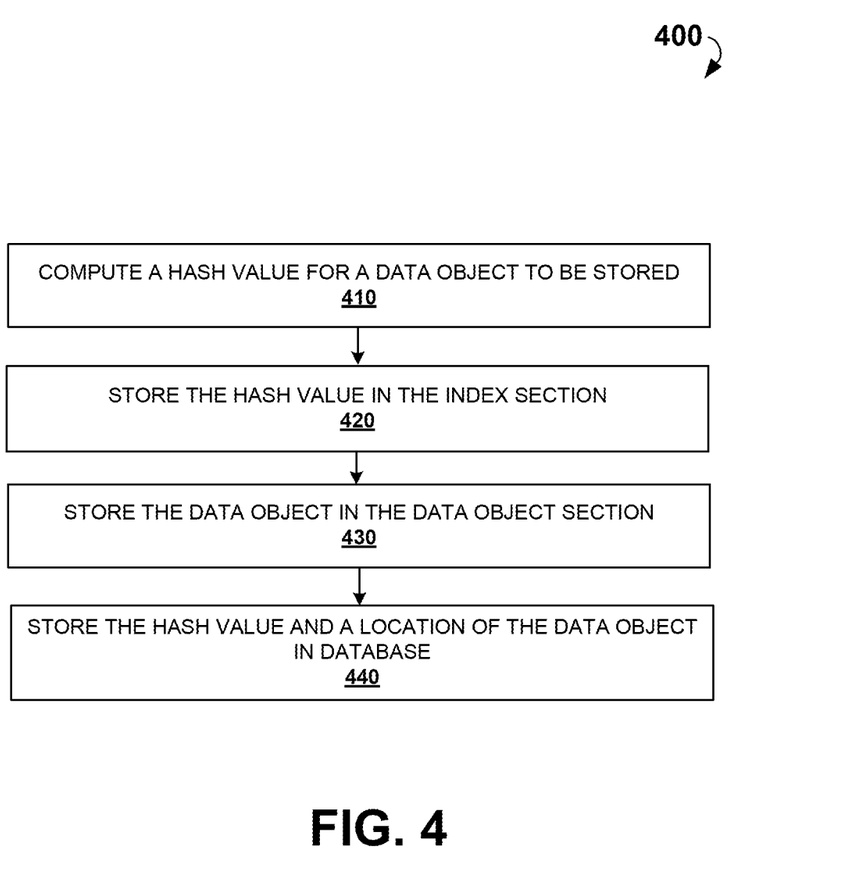
FIG. 4 shows a process flow diagram showing a method for writing a data object to storage device.

FIG. 4 shows a process flow diagram showing a method 400 for writing a data object to the chassis 210 according to an example embodiment. The method 400 may be performed by processing logic that may comprise hardware (e.g., decision making logic, dedicated logic, programmable logic, and microcode), software (such as software run on a general-purpose computer system or a dedicated machine), or a combination of both. In certain embodiments, the method 400 may be implemented in the system architecture 100 or 200 described above with reference to FIGS. 1 and 2.

As shown in FIG. 4, the method 400 may commence at operation 410 with the processing unit 110 computing a hash value for a data object to be stored (e.g., using SHA). At operation 420, the hash value is stored in the index section 310 of storage device 120. At operation 430, the processing unit 110 stores the data object to the data object section 320. At optional operation 440, the processing unit 110 may store the hash value and a location address of the data object to a database 220. Further, the operations 410-440 are repeated for each storage device 120 chosen to hold a replica. For example, to achieve a replication factor of 3, the operations 410-440 are implemented three times, once within each chassis 210A-C. Accordingly, each of the storage devices 120 may store a data object replica and a corresponding hash value. Each database 220A-220C may store a data object hash and the corresponding location within the chassis that the data object replica and hash is stored on. The location includes the storage device and the location within that device where the hash and the data object are stored.

Figure 5:
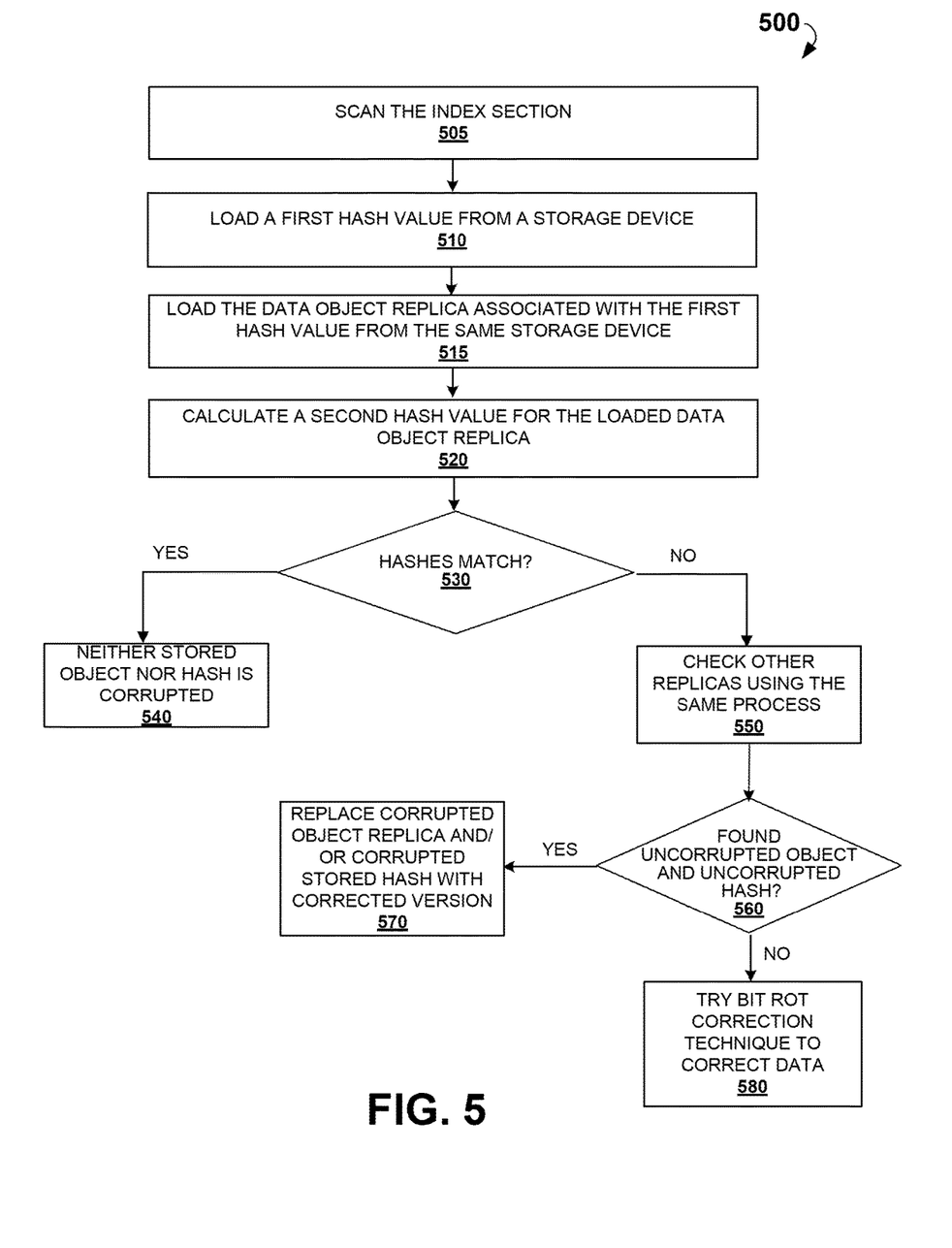
FIG. 5 shows a process flow diagram of a method for data scrubbing.

FIG. 5 shows a process flow diagram of a method 500 for data scrubbing according to an example embodiment. The method 500 may be performed by processing logic that may comprise hardware (e.g., decision making logic, dedicated logic, programmable logic, and microcode), software (such as software run on a general-purpose computer system or a dedicated machine), or a combination of both. In certain embodiments, the method 500 may be implemented in the system architecture 100 or 200 described above with reference to FIGS. 1 and 2.

The method 500 may commence at operation 505 with the processing unit 110 accessing and scanning the index section 310. At operation 510, the processing unit 110 may load the hash value (hereinafter referred to as "first hash value") from a storage device 120. At operation 515, the processing unit 110 may load the data object replica stored from the same storage device 120. At operation 520, the processing unit 110 may calculate a second hash value with respect to the loaded data object. At operation 530, the processing unit 110 may compare the first and second hash values. If it is determined that the first hash value and the second hash value are equal, as shown at operation 540, there is no error in the data object replica and in the hash value stored in the storage device 120. If, on the other hand, it is determined that the first hash value differs from the second hash value, the data object replica stored in the storage device 120 is considered invalid, and the method may proceed to operation 550.

At operation 550, corresponding objects in other replicas can be checked using the same process as described above. If, at operation 560, it is determined that at least one valid object or uncorrupted hash exists in the storage devices 120, at operation 570, the invalid data object or corrupted hash can be replaced with the correct version. If no valid object is found in the storage devices 120, then the method proceeds to operation 580, when techniques for correcting bit rot can be tried. The foregoing techniques are described in more detail below with references to FIGS. 6 and 7.

The method 500 can be performed for each data object replica stored in the storage devices 120A-120C independently. Additionally, the hash value written to the storage device can be itself verified by using the method 500. Those skilled in the art will appreciate that the method 500 may be repeated on a regular basis for every storage device 120.

According to various embodiments of the present disclosure, the storage devices 120 may have a minimum data size for which any changes can be made. For example, many HDDs may be divided in sectors of 512 bytes, thus even if only a single bit of a sector becomes unusable, the data stored in the entire data sector should be moved elsewhere. Additionally, some types of data corruption on storage devices 120 may result in multiple contiguous sectors becoming unusable. In this regard, more than one data object and/or hash may be affected. Thus, the present technology allows for intelligent data object scrubbing involving rewriting multiple data sectors and multiple hashes and multiple data objects, when required. This may allow moving full data objects, without unwanted splitting of them among multiple data objects or storage devices.

According to various embodiments of the present disclosure, the corrected data object and its corresponding index section are written to a new area of the storage device 120 which was previously unused.

In yet more embodiments, statistics may be recorded and regions that show repeated corruptions exceeding a threshold may be retired and never again used.

According to another aspect of the present technology and as already mentioned above, each index region can include a digital signature (a hash value, such as a SHA value) of the index section. Thus, before hash values are re-computed and compared to the stored hashes as described in the method 500, the index itself can be verified, and corruptions fixed in the same manner as previously described.

In various embodiments, the method 500 may be performed periodically, however the frequency for performing this method may be based on predetermined criteria as described below. In some examples, if an error is found and cannot be fixed, the techniques for data scrubbing described herein may be postponed for a predetermined time period, since storage devices 120 may fix their own errors periodically. In other examples, the scrubbing method can be started by the end-user manually, for example because the end-user suspects a corruption.

Frequency of scanning (see operation 505) may be based on the expected benefit because sometimes new issues can be created by the scanning. In addition to periodic scanning, opportunistic scanning can be performed. For example, if one or more data objects are read during an unrelated operation, the present technology can take advantage of that and perform the scanning and data scrubbing while this data is being read. Thus, next time data scrubbing is performed, it does not need to read these data objects again.

In various embodiments, the storage devices 120 can be divided into regions and various statistics can be kept on each region. Some examples include error counts, time of last scrub, time of last write, time of last read, threshold till retirement, and so forth. These statistics can be used to calculate a future time when each region should be re-scrubbed. Some storage devices 120 can report statistics regarding their own health so that a decision as to when to perform the data scrubbing can be based on this reported data. For example, age of device, expected lifetime, remaining lifetime, error detection rate, error correction rate, number of remapped sectors, and so forth can be reported. In contrast to HDDs, SSDs can better predict their own failures. Accordingly, data scrubbing frequency can be based on the type of the storage device and the information provided by the storage device.

It should also be mentioned that when the method 500 is performed, it may impact processes using the storage devices 120 by slowing them down. Therefore, the number of storage devices that are scrubbed at any given time and how "aggressively" they are scrubbed depend on various factors. For example, the storage devices can be scrubbed only when they are otherwise idle, all the time, only at light loads, opportunistically, or depending on other parameters concerning system loads and user response time.

Figure 6:
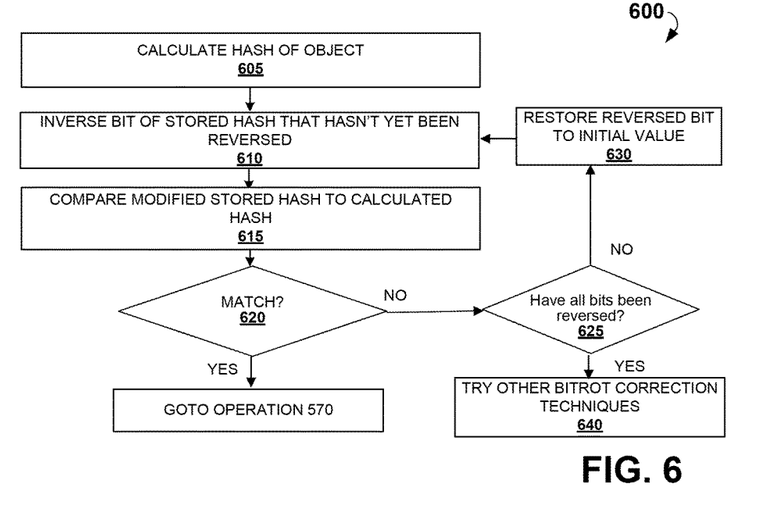
FIG. 6 shows a process flow diagram of a method for recovering data affected by bit rot.
Figure 7:
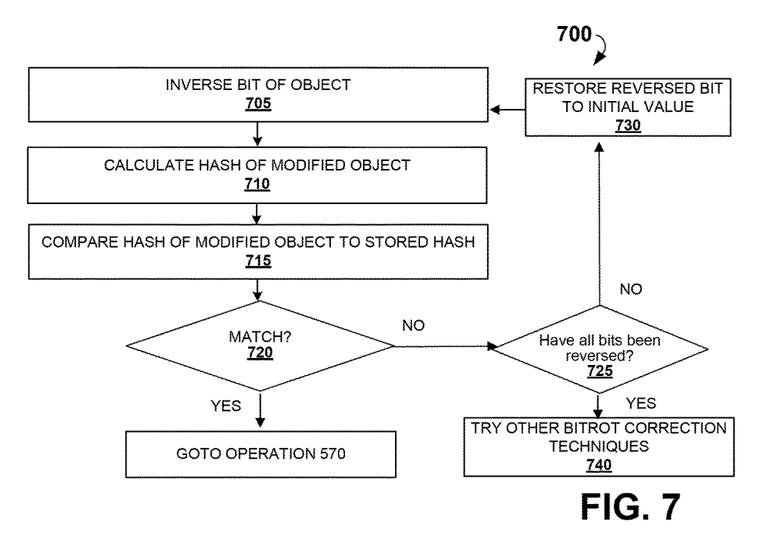
FIG. 7 shows a process flow diagram of a method for recovering data affected by bit rot.

FIGS. 6 and 7 show process flow diagrams of methods 600, 700 for recovering data from a bit rot. As already described above, the data scrubbing process may include rewriting a data object or hash by using a counterpart data object replica, which has been already verified to be valid. However, there might be situations when all data object replicas are corrupted or have other issues. If this is the case, a bit rot can be suspected and a corresponding technique employed. As can be seen in FIG. 7, these techniques may include inversing (flipping) bits in a data object 705, recalculating the hash values of the modified data objects 710, and comparing the hashes of the modified data objects to the stored hash 715. Furthermore, according to FIG. 6, these techniques may include calculating the hash of a data object 605, inversing (flipping) bits in the stored hash corresponding to the data object 610, and comparing the modified stored hash to the calculated hash 615. When the match is found (620, 720), the methods 600 and 700 may continue with operation 570 in which corrupted version is replaced with the corrected version of data object or hash value as previously described. If the match is not detected, the inversed bit may be restored to the initial value (630, 730) and another bit that has not yet been inversed may be flipped (610, 705). If all bits are already inversed (625, 725), other bitrot techniques may be tried 640, 740.

In various embodiments, the bitrot techniques may be independently performed on each storage device, as each device might contain differing failures. In other embodiments it may be performed once and all devices containing corrupt data objects or indexes be rewritten with the correct data.

Figure 8:
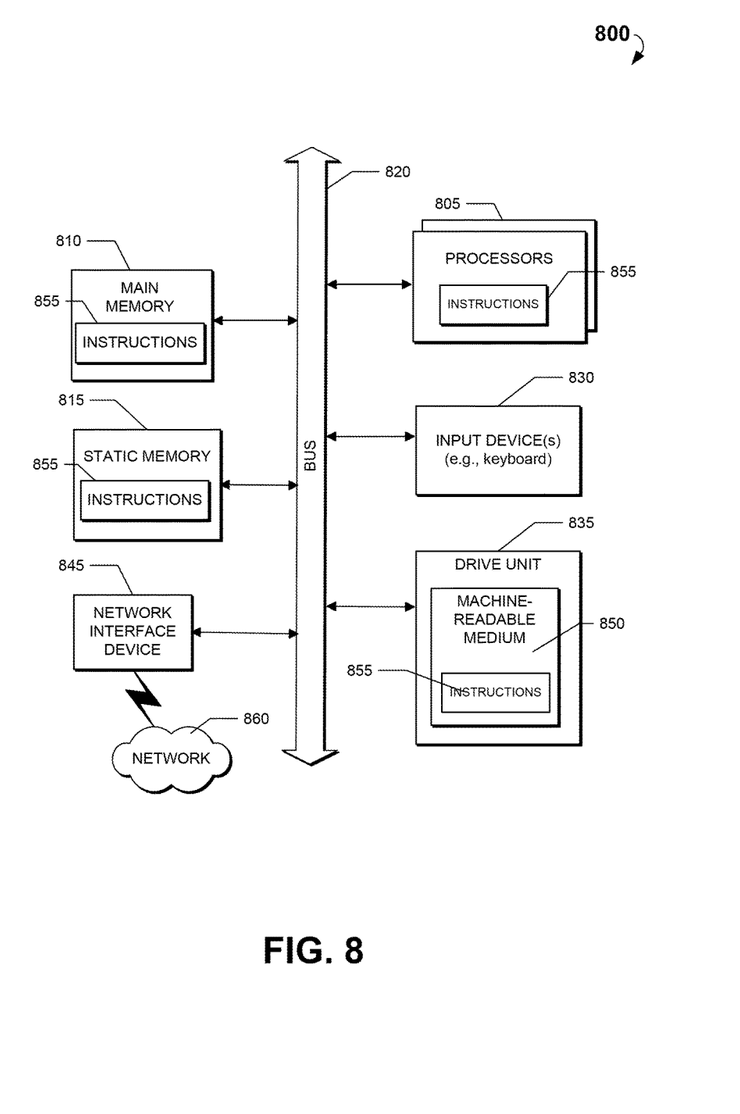
FIG. 8 shows a diagrammatic representation of a computing device for a machine in the example electronic form of a computer system, within which a set of instructions for causing the machine to perform any one or more of the methodologies discussed herein can be executed.

FIG. 8 shows a diagrammatic representation of a computing device for a machine in the example electronic form of a computer system 800, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a personal digital assistant , a cellular telephone, a portable music player (e.g., a portable hard drive audio device, such as an Moving Picture Experts Group Audio Layer 3 (MP3) player), gaming pad, portable gaming console, in-vehicle computer, smart-home computer, purpose built appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor or multiple processors (e.g., a central processing unit (CPU), a graphics processing unit (GPU), or both), and a main memory 810 and a static memory 815, which communicate with each other via a bus 820. The computer system 800 may also include at least one input device 830, such as an alphanumeric input device (e.g., a keyboard), a cursor control device (e.g., a mouse), and so forth. The computer system 800 may also include a disk drive unit 835 and a network interface device 845.

The disk drive unit 835 includes a computer-readable medium 850, which stores one or more sets of instructions and data structures (e.g., instructions 855) embodying or utilized by any one or more of the methodologies or functions described herein. The instructions 855 can also reside, completely or at least partially, within the main memory 810 and/or within the processors 805 during execution thereof by the computer system 800. The main memory 810 and the processors 805 also constitute machine-readable media.

The instructions 855 can further be transmitted or received over the network 860 via the network interface device 845 utilizing any one of a number of well-known transfer protocols (e.g., Hyper Text Transfer Protocol (HTTP), CAN, Serial, and Modbus). For example, the network 860 may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

While the computer-readable medium 850 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Go, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for data scrubbing are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for data scrubbing, the method comprising:
    maintaining a cluster-based storage system including a plurality of storage devices;
    storing a plurality of replicas associated with a data object in a predefined number of the storage devices, one replica per one storage device;
    storing a plurality of hash values associated with each replica in the plurality of storage devices, one hash value per one storage device;
    loading, by one or more processors, a first hash value of the plurality of hash values from one of the storage devices;
    loading, by the one or more processors, a replica of the data object corresponding to the first hash value to obtain a loaded data object;
    calculating, by the one or more processors, a second hash value with respect to the loaded data object;
    comparing, by the one or more processors, the first hash value and the second hash value to identify a corruption of either the data object or the first hash value;
    based on the comparison of the first hash value and the second hash value, restoring, by the one or more processors, the data object and the first hash value based at least in part on one replica of the plurality of replicas;
    periodically scanning the plurality of storage devices storing the plurality of replicas associated with the data object;
    recomputing a hash value of each of the plurality of replicas to obtain a recomputed hash value;
    comparing each of the plurality of hash values to the recomputed hash value;
    based on the comparison of the plurality of hash values to the recomputed hash value, assessing validity of each of the plurality of replicas;
    based on the assessment of validity of each of the plurality of replicas, selectively replacing one or more of the plurality of replicas with a verified replica;
    determining that all replicas are corrupt;
    creating an adjusted hash value by flipping one bit of the hash value;
    comparing the adjusted hash value and the recomputed hash value; and
    based on the comparison of the adjusted hash value and the recomputed hash value, determining whether the adjusted hash value and the recomputed hash value match, wherein if the adjusted hash value matches the recomputed hash value, all hash values are replaced with a verified hash value, and if the adjusted hash value mismatches the recomputed hash value, the bit is restored and a further bit is flipped.

2. The method of claim 1, wherein the hash value is computed over the data object using a hash function.

3. The method of claim 1, wherein each of the plurality of storage devices is divided into multiple index sections and data sections, each index section including hash values and sizes of data objects stored in the corresponding data sections.

4. The method of claim 1, further comprising:
    generating a hash value for the data object;
    writing a predefined number of replicas of the data object and the hash value to the plurality of storage devices; and
    storing the data object in a data section and storing the hash value in an index section.

5. The method of claim 1, wherein the first hash value represents a digital signature of the data object.

6. The method of claim 1, further comprising:
    based on the comparison of the plurality of hash values to the recomputed hash value, assessing validity of each of the plurality of hash values; and
    based on the assessment of validity of each of the plurality of hash values, selectively replacing one of more of the plurality of hash values with a verified hash value.

7. The method of claim 1, wherein a frequency of the scanning is based on one or more predefined criteria, the predefined criteria including one or more of the following: an age of a storage device, a duration of usage, a storage device health report, and an operational state.

8. The method of claim 1, further comprising:
    based on the comparison of the adjusted hash value and the recomputed hash value, determining that no bit flips in the hash value resulted in a matching hash value;
    creating an adjusted data object by flipping one bit of the data object;
    computing an adjusted hash value over the adjusted data object; comparing the adjusted hash value to the hash values stored in the storage devices; and
    based on the comparison of the adjusted hash value to the hash value stored in the storage devices, determining whether the adjusted hash value and any of the hash values match; wherein if the adjusted hash value matches the hash value, all data object replicas are replaced with the adjusted data object, and if the adjusted hash value mismatches the hash value, the bit is restored and a further bit is flipped.

9. A system for data scrubbing, the system comprising:
    one or more processors configured to:
    maintain a cluster-based storage system including a plurality of storage devices;
    store a plurality of replicas associated with a data object in a predefined number of the storage devices, one replica per one storage device;
    store a plurality of hash values associated with each replica in the plurality of storage devices, one hash value per one storage device;
    load a first hash value of the plurality of hash values from one of the storage devices;
    load a replica of the data object corresponding to the first hash value to obtain a loaded data object;
    calculate a second hash value with respect to the loaded data object;
    compare the first hash value and the second hash value to identify a corruption of either the data object or the first hash value;
    based on the comparison of the first hash value and the second hash value, restore the data object and the first hash value based at least in part on one replica of the plurality of replicas;
    periodically scan the plurality of storage devices storing the plurality of replicas associated with the data object;
    recompute a hash value of each of the plurality of replicas to obtain a recomputed hash value;
    compare each of the plurality of hash values to the recomputed hash value;

based on the comparison of the plurality of hash values to the recomputed hash value, assess validity of each of the plurality of replicas;

based on the assessment of validity of each of the plurality of replicas, selectively replace one or more of the plurality of replicas with a verified replica;

determine that all replicas are corrupt;

create an adjusted hash value by flipping one bit of the hash value;

compare the adjusted hash value and the recomputed hash value; and based on the comparison of the adjusted hash value and the recomputed hash value, determine whether the adjusted hash value and the recomputed hash value match, wherein if the adjusted hash value matches the recomputed hash value, all hash values are replaced with a verified hash value, and if the adjusted hash value mismatches the recomputed hash value, the bit is restored and a further bit is flipped.

10. The system of claim 9, wherein the hash value is computed over the data object using a hash function.

11. The system of claim 9, wherein each of the plurality of storage devices is divided into multiple index sections and data sections, each index section including hash values and sizes of data objects stored in the corresponding data sections.

12. The system of claim 9, wherein the one or more processors are further configured to:

generate a hash value of the data object;

write a predefined number of replicas of the data object and the hash value to the predefined number of storage devices; and store, on each of the storage devices, the data object in a data section and store the hash value in an index section.

13. The system of claim 9, wherein the hash value represents a digital signature of the data object.

14. The system of claim 9, wherein the one or more processors are further configured to:

based on the comparison of the plurality of hash values to the recomputed hash value, assess validity of each of the plurality of hash values; and based on the assessment of validity of each of the plurality of hash values, selectively replace one of more of the plurality of hash values with a verified hash value.

15. The system of claim 9, wherein a frequency of the scanning is based on one or more predefined criteria, the predefined criteria including one or more of the following: an age of a storage device, a duration of usage, a storage device health report, and an operational state.

16. The system of claim 9, wherein the one or more processors are further configured to:

based on the comparison of the adjusted hash value and the recomputed hash value, determine that no bit flips in the hash value resulted in a matching hash value;

create an adjusted data object by flipping one bit of the data object;

compute an adjusted hash value over the adjusted data object;

compare the adjusted hash value to the hash values stored in the storage devices; and based on the comparison of the adjusted hash value to the hash values stored in the storage devices, determine whether the adjusted hash value and any of the hash values match; wherein if the adjusted hash value matches the hash value, all data object replicas are replaced with the adjusted data object, and if the adjusted hash value mismatches the hash value, the bit is restored and a further bit is flipped.

17. A machine-readable non-transitory medium comprising instructions, which when implemented by one or more processors, perform the following operations:

maintain a cluster-based storage system including a plurality of storage devices;

store a plurality of replicas associated with a data object in a predefined number of the storage devices, one replica per one storage device;

store a plurality of hash values associated with each replica in the plurality of storage devices, one hash value per one storage device;

load a first hash value of the plurality of hash values from one of the storage devices;

load a replica of the data object corresponding to the first hash value to obtain a loaded data object;

calculate a second hash value with respect to the loaded data object;

compare the first hash value and the second hash value to identify a corruption of either the data object or the first hash value;

based on the comparison of the first hash value and the second hash value, restore the data object and the first hash value based at least in part on one replica of the plurality of replicas;

periodically scan the plurality of storage devices storing the plurality of replicas associated with the data object;

recompute a hash value of each of the plurality of replicas to obtain a recomputed hash value;

compare each of the plurality of hash values to the recomputed hash value;

based on the comparison of the plurality of hash values to the recomputed hash value, assess validity of each of the plurality of replicas;

based on the assessment of validity of each of the plurality of replicas, selectively replace one or more of the plurality of replicas with a verified replica;

determine that all replicas are corrupt;

create an adjusted hash value by flipping one bit of the hash value;

compare the adjusted hash value and the recomputed hash value; and based on the comparison of the adjusted hash value and the recomputed hash value, determine whether the adjusted hash value and the recomputed hash value match, wherein if the adjusted hash value matches the recomputed hash value, all hash values are replaced with a verified hash value, and if the adjusted hash value mismatches the recomputed hash value, the bit is restored and a further bit is flipped.

18. The machine-readable non-transitory medium of claim 17, wherein the hash value is computed over the data object using a hash function.

19. The machine-readable non-transitory medium of claim 17, wherein each of the plurality of storage devices is divided into multiple index sections and data sections, each index section including hash values and sizes of data objects stored in the corresponding data sections.

20. The machine-readable non-transitory medium of claim 17, wherein the one or more processors further perform the following operations:

generate a hash value of the data object;

write a predefined number of replicas of the data object and the hash value to the predefined number of storage devices; and store, on each of the storage devices, the data object in a data section and store the hash value in an index section.

21. The machine-readable non-transitory medium of claim 17, wherein the hash value represents a digital signature of the data object.

\* \* \* \* \*

UNITED STATES PATENT AND TRADEMARK OFFICE
CERTIFICATE OF CORRECTION

| | |
|---|---|
| PATENT NO. | : 9,715,521 B2 |
| APPLICATION NO. | : 14/309796 |
| DATED | : July 25, 2017 |
| INVENTOR(S) | : Frank E. Barrus et al. |

It is certified that error appears in the above-identified patent and that said Letters Patent is hereby corrected as shown below:

On the Title Page

Item (73), please delete "STORAGECRAFT TECHNOLOGY CORPORATION, Draper, UT (US)" and insert -- EXABLOX CORPORATION, Sunnyvale, CA (US) -- therefor Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*